United States Patent [19]
Benajam
[11] Patent Number: 4,656,009
[45] Date of Patent: Apr. 7, 1987

[54] REACTION SUPPORT INCORPORATING MULTIPLE RECIPIENTS FOR TESTING LIQUID DOSES

[75] Inventor: Alain C. A. Benajam, Bobigny, France

[73] Assignee: Le Materiel Biomedical, Paris, France

[21] Appl. No.: 655,352

[22] Filed: Sep. 27, 1984

Related U.S. Application Data

[63] Continuation of Ser. No. 402,354, Jul. 27, 1982, abandoned.

[30] Foreign Application Priority Data

Aug. 5, 1981 [FR] France ............ 81 15163

[51] Int. Cl.[4] ............ G01N 21/07
[52] U.S. Cl. ............ 422/102; 356/246; 422/64; 422/72; 436/45; 436/809; 494/16
[58] Field of Search ............ 356/244, 246; 422/64, 422/72, 102, 104; 436/45, 807, 809; 494/16, 20

[56] References Cited

U.S. PATENT DOCUMENTS

| | | | |
|---|---|---|---|
| 3,763,374 | 10/1973 | Tiffany et al. | 356/246 X |
| 3,873,217 | 3/1975 | Anderson et al. | 422/72 X |
| 3,883,308 | 5/1975 | Matte | 422/64 |
| 3,890,101 | 6/1975 | Tiffany et al. | 422/72 X |
| 3,901,658 | 8/1975 | Burtis et al. | 494/16 X |
| 4,035,156 | 7/1977 | Shumate | 422/72 |
| 4,192,250 | 3/1980 | Van Duijn | 422/72 X |

FOREIGN PATENT DOCUMENTS

| | | | |
|---|---|---|---|
| 7310327 | 2/1974 | Netherlands | 356/246 |

*Primary Examiner*—Barry S. Richman
*Assistant Examiner*—Michael S. Gzybowski
*Attorney, Agent, or Firm*—Fisher, Christen & Sabol

[57] ABSTRACT

The invention relates to a reaction support incorporating multiple recipients for testing liquid doses, comprising a transparent plate provided with a plurality of recesses of which each forms one of the recipient. According to the invention, this support is characterized in that the plate is in the form of a disc and in that the recesses are obturated at the top and are each in communication with the outside via an eccentric orifice opening on the upper face of the disc. The invention is particularly applicable in the domain of biology.

4 Claims, 8 Drawing Figures

REACTION SUPPORT INCORPORATING MULTIPLE RECIPIENTS FOR TESTING LIQUID DOSES

This application is a continuation of application Ser. No. 402,354, filed July 27, 1982, now abandoned.

BACKGROUND OF THE INVENTION

The present invention relates to a reaction support incorporating multiple recipients for testing liquid doses.

It is known, for example in biology, immunology, etc . . . , that it is necessary to subject a plurality of doses of liquids, such as blood, serum, etc . . . simultaneously to the action of reagents, to enable this liquids to be classified.

To this end, reaction supports, or so-called TERASAKI plates, are already known, which are constituted by a transparent rectangular plate in which are provided a plurality of recesses arranged in rows and columns. Each of these recesses forms an open recipient in which a dose of liquid and the corresponding reagent or reagents can be introduced. The results of the action of the reagents (for example the formation of agglomerates) appear on the transparent bottom of the recesses, where they are detected optically and/or electronically.

Such reaction supports are widely used and are entirely satisfactory. However, they cannot be used in the event of the reactions requiring stirring or centrifugation, since the liquid in the recesses then risks being projected from the recesses. Moreover, they do not lend themselves well to automatization of the tests made on the liquid doses.

SUMMARY OF THE INVENTION

It is an object of the present invention to remedy these drawbacks and it relates to a reaction support incorporating multiple recipients allowing both stirring and/or centrifugation and automatization of the test processes.

To this end, according to the invention, the reaction support incorporating multiple recipients for testing doses of liquids, comprising a transparent plate provided with a plurality of recesses of which each forms one of said recipients, is noteworthy in that said plate is in the form of a disc and the recesses are obturated at the top and are each in communication with the outside via an eccentric orifice opening on the upper face of the disc.

The disc is advantageously pierced at its centre with a hole allowing it to be assembled on a rotating vertical shaft, or it is fast with a shaft orthogonal with respect to its plane capable of being connected to means for driving in rotation. In this way, it is possible to subject the disc to movements of stirring in rotation or of centrifugation.

The eccentric orifice is preferably closer to the centre of the disc than the corresponding recess, so that, during centrifugation, the liquid cannot escape through said orifice.

The different recesses and orifices are preferably arranged in radii and concentric circles.

In an advantageous embodiment, the disc is formed by the superposition and connection of at least two coaxial circular plates of which one comprises said recesses and the other through holes each forming one of said orifices.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
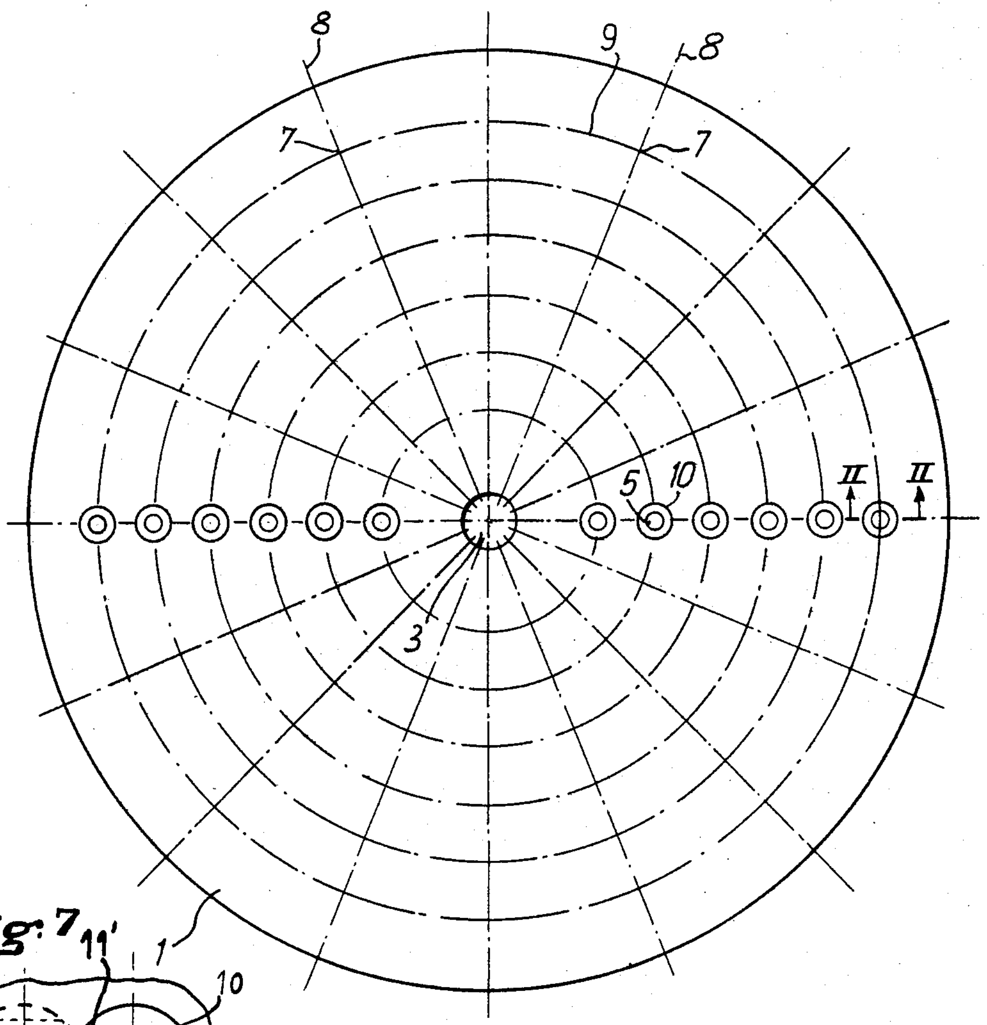
FIG. 1 is a plan view of the upper plate of an embodiment of reaction supports according to the invention.

Referring now to the drawings, the embodiment of the reaction support incorporating multiple recipients according to the invention, described hereinafter with reference to FIGS. 1 to 6, comprises an upper disc 1 (FIG. 1) and a lower disc 2 (FIG. 3) which are superposed and assembled for example by adhesion. Discs 1 and 2 are made of transparent synthetic material and are provided at their centre with holes 3 or 4 respectively, to allow passage of a rotating drive shaft when the discs 1 and 2 are superposed.

The upper disc 1 is provided with a plurality of through holes 5 of which the axes 6, orthogonal with respect to the plane of the disc 1, are distributed at a plurality of points 7 located at the intersection of radii 8 and of concentric circles 9. Furthermore, each hole 5 flares out upwardly, due to a funnel-shaped portion 10, of axis 6.

To render FIG. 1 clearer, only a few holes 5 have been shown.

The lower transparent disc 2 comprises a plurality of blind holes 11 of which the axes 12 are distributed at a plurality of points 13 located at the intersection of radii 14 and of concentric circles 15.

Furthermore, with each blind hole 11 there is associated an inclined notch 16, symmetrical with respect to the corresponding diameter 14 and disposed with respect to the hole 11, towards the centre of the disc 2.

To obtain a reaction support according to the invention, the disc 1 is superposed on disc 2, so that the axis 6 of the holes 5 and 10 comes into register with the median axis 17 of the oblique notches 16. In this position, shown in FIG. 6, each blind hole 11 is obturated by the disc 1, but it is in communication with the outside, in its top part, via the oblique notch 16 and holes 5 and 10. The radial length of the notches 16 is preferably equal to the diameter of the holes 5 (cf. FIG. 6).

In this way, it is possible to fill the blind hole 11 (or recipient 11) with doses of liquid by introducing, for example, the needle of a syringe into the funnel 10, the liquid then passing through the hole 10 and the notch 16 to reach the recipient 11. In the same way, it is possible to introduce one or more reagents in the recipients 11.

When stirring or centrifugation is necessary, it suffices to subject the disc 1, 2 to this movement and, since the recipients 11 are obturated by the disc 1 and the notches 16 and the holes 10 are nearer the diameter of the disc 1, 2 than the recipients 11, there is no risk of the liquid contained in these recipients 11 escaping to the outside.

In the example shown, it has been assumed that the disc was composed of two superposed plates 1, 2. Of course, the disc according to the invention might be composed, for example, of three superposed plates. To this end, it may be provided that the holes 11 pass completely through the plate 2 and that they be obturated by a third plate disposed on the side opposite disc 1 with respect to disc 2, as symbolized in FIG. 6 by the mixed line 18.

Figure 7:
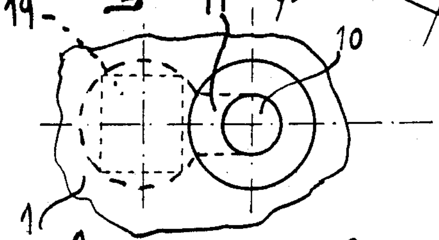
FIG. 7 illustrates in enlarged plan view a variant embodiment of reaction supports according to the invention.
Figure 8:
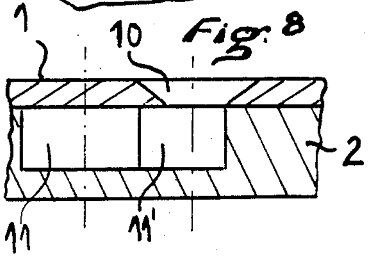
FIG. 8 is a longitudinal section through FIG. 7 and may be compared with FIG. 6.
Figure 2:
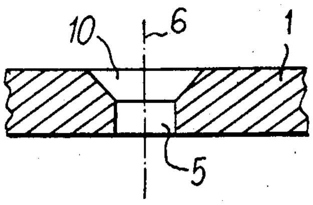
FIG. 2 is an enlarged view in section along line II—II of FIG. 1.
Figure 3:
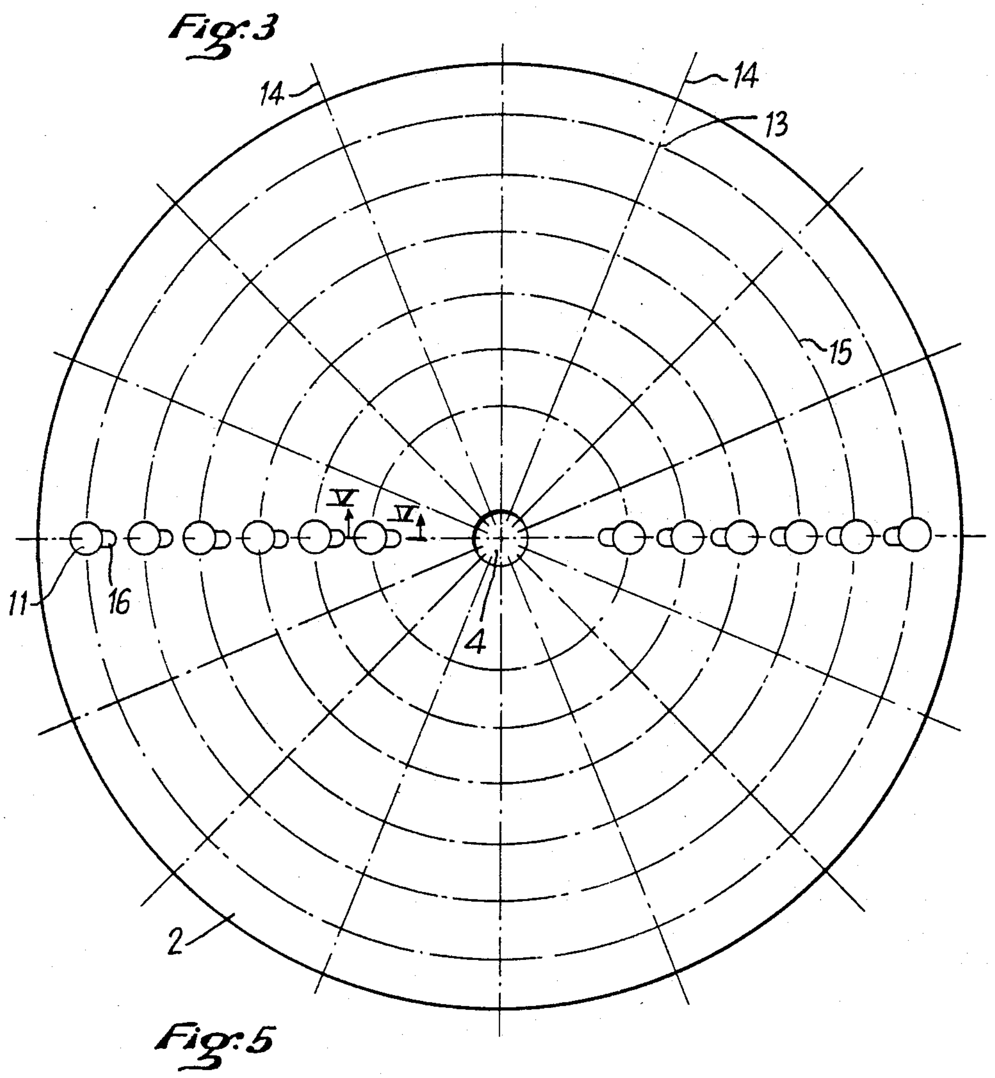
FIG. 3 is a plan view of the lower disc associated with the upper disc of FIGS. 1 and 2.
Figure 5:
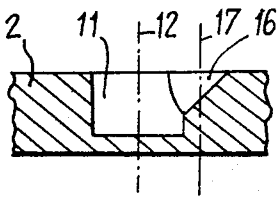
FIG. 5 is an enlarged view in section along line V—V of FIG. 3.
Figure 4:
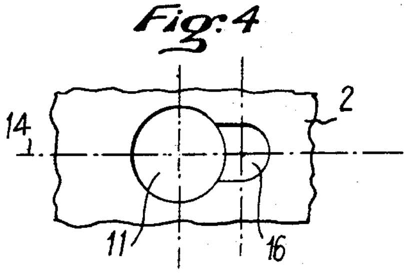
FIG. 4 is an enlarged plan view of an orifice of the lower disc of FIG. 3.
Figure 6:
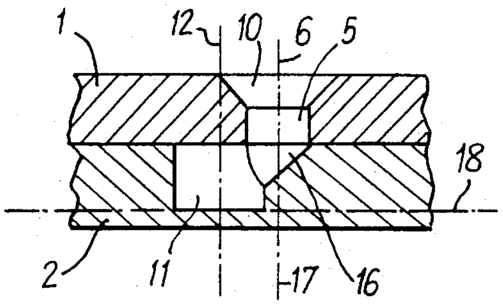
FIG. 6 is an enlarged view in partial diametrical section of the support according to the invention at the level of a reaction recipient.

In the variant embodiment of FIGS. 7 and 8, the upper disc 1 comprises only the funnel-shaped portions 10 of holes 5. On the other hand, the blind holes 11 are, in the lower disc 2, extended towards portions 10 by a flat-bottomed communicating hole 11' which is sufficiently long for the upper edge of the funnels 10 to be located outside the recipient 11, or at least for it to clear on the bottom thereof a field of vision 19 covering virtually the major part of said bottom.

What is claimed is:

1. A reaction support rotor comprising first and second transparent discs, said first transparent disc having a plurality of radial arrays of through-holes located therein and being fixedly superimposed on said second transparent disc, said second transparent disc having a plurality of radial arrays of bores therein, which bores partially extend into said second transparent disc to define enclosed compartments therein, each radial array of bores in said second transparent disc being disposed below and in alignment with a respective radial array of through-holes in said first transparent disc such that in each radial array of bores and its respective radial array of through-holes, each bore has its own corresponding through-hole and is positioned radially outward therefrom and each bore has only one through-hole corresponding thereto, said second transparent disc further comprising communication means connecting each bore with its corresponding through-hole, said communication means comprising means defining inclined passageways.

2. The apparatus of claim 1 wherein said through-holes have flared upper surfaces.

3. A reaction support rotor comprising first and second transparent discs, said first transparent disc having a plurality of radial arrays of through-holes located therein and being fixedly superimposed on said second transparent disc, said second transparent disc having a plurality of radial arrays of first bores, having a diameter, therein, which first bores partially extend into said second transparent disc to define enclosed compartments therein, each radial array of first bores in said second transparent disc being disposed below and in alignment with a respective radial array of through-holes in said first transparent disc such that in each radial array of first bores and its respective radial array of through-holes, each first bore has its own corresponding through-hole and is positioned radially outward therefrom and each bore has only one through-hole corresponding thereto, said second transparent disc further comprising communication means connecting each first bore with its corresponding through-hole, said communication means comprising a second bore, having a diameter, associated with and adjacent each of said first bores and a means defining a passageway corresponding to and connecting each said second bore and its associated first bore, each said passageway having a width equal to the diameter of one of its corresponding first and second bores.

4. The apparatus of claim 3 wherein said through-holes have flared upper surfaces.

* * * * *